United States Patent [19]
Yang et al.

[11] Patent Number: 5,410,535
[45] Date of Patent: Apr. 25, 1995

[54] AUTOMATIC SELECTION OF AN INTERFACE FOR ETHERNET STATIONS

[75] Inventors: Henry S. Yang, Andover; Jerry D. Hutchison, Littleton, both of Mass.

[73] Assignee: Digital Equipment Corporation, Maynard, Mass.

[21] Appl. No.: 907,950

[22] Filed: Jul. 2, 1992

[51] Int. Cl.⁶ .............................................. H04L 1/24
[52] U.S. Cl. ........................................ 370/13; 370/14; 370/16; 370/85.3; 371/11.2
[58] Field of Search ................. 371/20.1, 8.2, 11.2, 371/68.2, 8.1, 11.1, 20.3-20.6; 370/13, 14, 16, 17, 85.1, 85.2, 85.3, 85.9, 110-111; 340/825.01, 825.03, 825.04

[56] References Cited

U.S. PATENT DOCUMENTS

| | | | |
|---|---|---|---|
| 5,084,870 | 1/1992 | Hutchison et al. | 370/94.3 X |
| 5,115,199 | 5/1992 | Yamagishi | 370/17 X |
| 5,200,949 | 4/1993 | Kobayashi | 370/16 |
| 5,289,458 | 2/1994 | Taha | 370/16 |

OTHER PUBLICATIONS

1991 Communications Data Book, Section 4—LAN Transceivers, pp. 4–1 through 4–10 pub. by Level One, Folsom, California 95630.

D. Wong, "Second Generation 10Base T Silicon Solutions" Wescon Conference Record vol. 35, Nov. 1991, North Hollywood US pp. 238–242.

Y. L. Linde, "Standards for Fiber Optics Ethernet" Electro Conference Record vol. 15, May 1990, Los Angeles US pp. 718–722.

*Primary Examiner*—Melvin Marcelo
*Attorney, Agent, or Firm*—Kenneth F. Kozik

[57] ABSTRACT

Method and apparatus for automatically switching an Ethernet station interface to choose between two protocols and, possibly, two external connector configurations, to adapt the station automatically to the correct one of two communication media types, such as the twisted-pair medium served by the 10BASE-T protocol, and other media types, served by the attachment unit interface (AUI). The invention continually tests for proper operation in the currently selected protocol, and switches to the other protocol upon failure of a test. If one of two available external connectors is used to connect the station to a network, the invention chooses between the connectors automatically, such that manual switching between them is not required.

30 Claims, 9 Drawing Sheets

AUTOMATIC SELECTION OF AN INTERFACE FOR ETHERNET STATIONS

CROSS-REFERENCE TO RELATED APPLICATION

This application is closely related to the subject matter of a concurrently filed application entitled "Common Interface for a Communication Network," by Jerry Hutchison et al. given Ser. No. 07/907,951, assigned to the same assignee as this application and designated by the assignee's docket number PD92-0387.

BACKGROUND OF THE INVENTION

This invention relates generally to hardware interfaces between communication stations and various types of transmission media used in communication networks, particularly networks that employ an access protocol commonly referred to as Carrier Sense Multiple Access with Collision Detection (CSMA/CD). One widely used CSMA/CD protocol is commonly known as Ethernet. The CSMA/CD protocol is defined in ANSI/IEEE Std 802.3, published by the Institute of Electrical and Electronics Engineers, Inc., 345 East 45th Street, New York, N.Y. 10017, and referred to in this specification as "the IEEE standards."

Modern communications employ a variety of communication media, including twisted pairs of conductors, optical fibers, and coaxial cables. The equipment at each network station must obviously be designed differently to interface with these different media, and the IEEE standards make a logical separation of station equipment into media-dependent and media-independent functional modules. The media-independent modules include a physical signaling module (PLS), a media access control module (MAC), and a logical link control module (LLC). The media-dependent station equipment module is referred to as the media attachment unit (MAU).

Since the IEEE standard protocol supports different communication media, vendors of station equipment must provide support for connection to many, and ideally all, media types. Each medium type has different specifications for its connector, signal levels, transmission line signal conditioning, electrical isolation, and safety requirements. One approach to station design would be to provide a universal station that included media attachment units (MAUs) for every conceivable communication medium, but this would require costly and inefficient use of input/output (I/O) panel space and circuit board space in the station equipment. Moreover, the necessary profusion of connector types on each station would tend to be confusing to the average equipment user.

A typical compromise in station equipment design is to provide two external connectors: one to connect directly to a widely used twisted-pair communication medium, and the other to connect to another selected media type, through an external media attachment unit (MAU). This is in conformance with the IEEE standards, which defines station equipment (or data terminal equipment, DTE) in two permissible ways. First, the DTE can be defined to include all media-independent and media-dependent equipment, right up to the medium itself. In this case, the DTE includes an integral media attachment unit (MAU) for connection to a commonly used medium, such as a twisted-pair medium. In the IEEE standards, this mode of operation with a twisted-pair medium is referred to as 10BASE-T operation (pronounced ten-base-tee), and the connector for coupling to the twisted-pair medium is referred to as a 10BASE-T connector. The other way that the DTE can be defined is to include only the media-independent equipment, and exclude the MAU. In this configuration, an MAU is usually, but not necessarily, an external piece of hardware. In accordance with the IEEE standards, the MAU is coupled to the media-independent station equipment through an interface referred to as the attachment unit interface (AUI). The AUI is defined in the standard to include a connector that can be coupled to a variety of off-the-shelf MAU modules that can be purchased to connect to various communication media.

Therefore, a useful configuration for station equipment includes a 10BASE-T connector for coupling directly to twisted-pair media, and an AUI connector for connecting to another selected medium, through an appropriate external MAU. Nevertheless, this configuration has some significant disadvantages. One is that the standard AUI interface uses what is referred to as a 15-pin Sub-D connector with a slide-latch, at the station end of the interface. This connector is relatively large, so uses considerable space on the station, and is not as reliable as other connector types. Perhaps more important is the difficulty that a customer can still encounter in configuring a station to connect to a particular network. Basically, the customer must still choose which connector to use.

One known solution to this problem is to combine the two types of connectors, AUI and 10BASE-T, into a single, larger connector assembly. This provides some degree of cabling simplification for the customer, but still requires knowledge of which network medium is being used, so that the station can be switched to the appropriate configuration.

Another useful two-connector configuration for station equipment includes an AUI connector and a 10BASE-F connector for connection a fiber-optic medium. Specifications for the 10BASE-F connector may be found in a Draft Supplement to ANSI/IEEE Std. 802.3-1990, dated Dec. 16, 1991, but the details of the connector design are not important to the present invention. Conceptually, the 10BASE-F proposed standard fiber optic media is similar to the 10BASE-T standard for twisted pair media. The station may also have a hardware-based or software-based switch for selecting the appropriate interface. In one arrangement, the user must connect the appropriate cable to one connector (AUI or 10BASE-F) and set the switch appropriately. In another arrangement, the user connects both cables, for redundancy, but must select which one to use by means of the switch. Since the user cannot be relied on at all times to select the appropriate cable and switch setting or, in the redundancy case, to select the switch setting only, this two-connector configuration presents the same difficulties as the one involving AUI and 10BASE-T connectors.

As will be appreciated from the foregoing, there is still a need for improvement and simplification in the manner in which station equipment is configured for connection to various network media. The present invention provides a simple yet elegant solution to this problem.

SUMMARY OF THE INVENTION

The present invention resides in a method and apparatus for use in a station that is connectable to more than one type of communication medium in a network that employs a Carrier Sense Multiple Access with Collision Detection (CSMA/CD) protocol. The method and apparatus function to configure the station automatically for a particular communication medium.

Briefly, and in general terms, the method of the invention comprises the steps of enabling a first mode of operation of the station; determining whether the station operates properly in the first mode; continuing operation in the first mode if proper operation in that mode is determined; enabling a second mode of operation if proper operation in the first mode is not determined; determining whether the station operates properly in the second mode;.continuing operation in the second mode if proper operation in that mode is determined; and returning to the first recited step of enabling the first mode of operation, if proper operation in the second mode is not determined.

In illustrative embodiments of the invention, the first mode of operation is in accordance with either the 10BASE-T standard for a twisted-pair communication medium, or the 10BASE-F standard for a fiber optic medium, and the second mode of operation is in accordance with a standard attachment unit interface (AUI) for connection to a different medium type through an appropriate media attachment unit (MAU). In one embodiment, the first and second modes operate through a common interface connector, while in another embodiment the first and second modes operated through separate connectors for the two media types. More specifically, the step of determining whether the station operates properly in the first mode includes transmitting link test pulses onto the network and waiting for an appropriate response. Optionally, for the common interface embodiment, the step of determining whether the station operates properly in the first mode further includes testing for the presence of receive data signals (pertaining to the second mode of operation) when the station is not actively transmitting while in the first mode of operation. The detection of receive data signals is indicative of network operation in the second mode.

The step of determining whether the station operates properly in the second mode includes detecting the presence of a receive data signal or a receive collision signal while transmitting a packet of data from the station. The absence of a data input signal or a collision signal indicates improper operation in the second mode.

Briefly, the apparatus of the invention includes means for enabling a first mode of operation of the station; means for determining whether the station operates properly in the first mode; means for continuing operation in the first mode if proper operation in that mode is determined; means for enabling a second mode of operation if proper operation in the first mode is not determined; means for determining whether the station operates properly in the second mode; means for continuing operation in the second mode if proper operation in that mode is determined, and returning control to the means for enabling the first mode of operation, if proper operation in the second mode is not determined.

It will be appreciated from the foregoing that the present invention represents a significant advance in the field of network communication systems of using a CSMA/CD protocol. In particular, the invention provides for automatic configuration of a station to connect to one of two different media types, such as 10BASE-T and AUI, or 10BASE-F or AUI, either through a common interface or through a selected one of two connectors. Other aspects and advantages of the invention will become apparent from the following more detailed description.

DESCRIPTION OF THE PREFERRED EMBODIMENT

Figure 1:
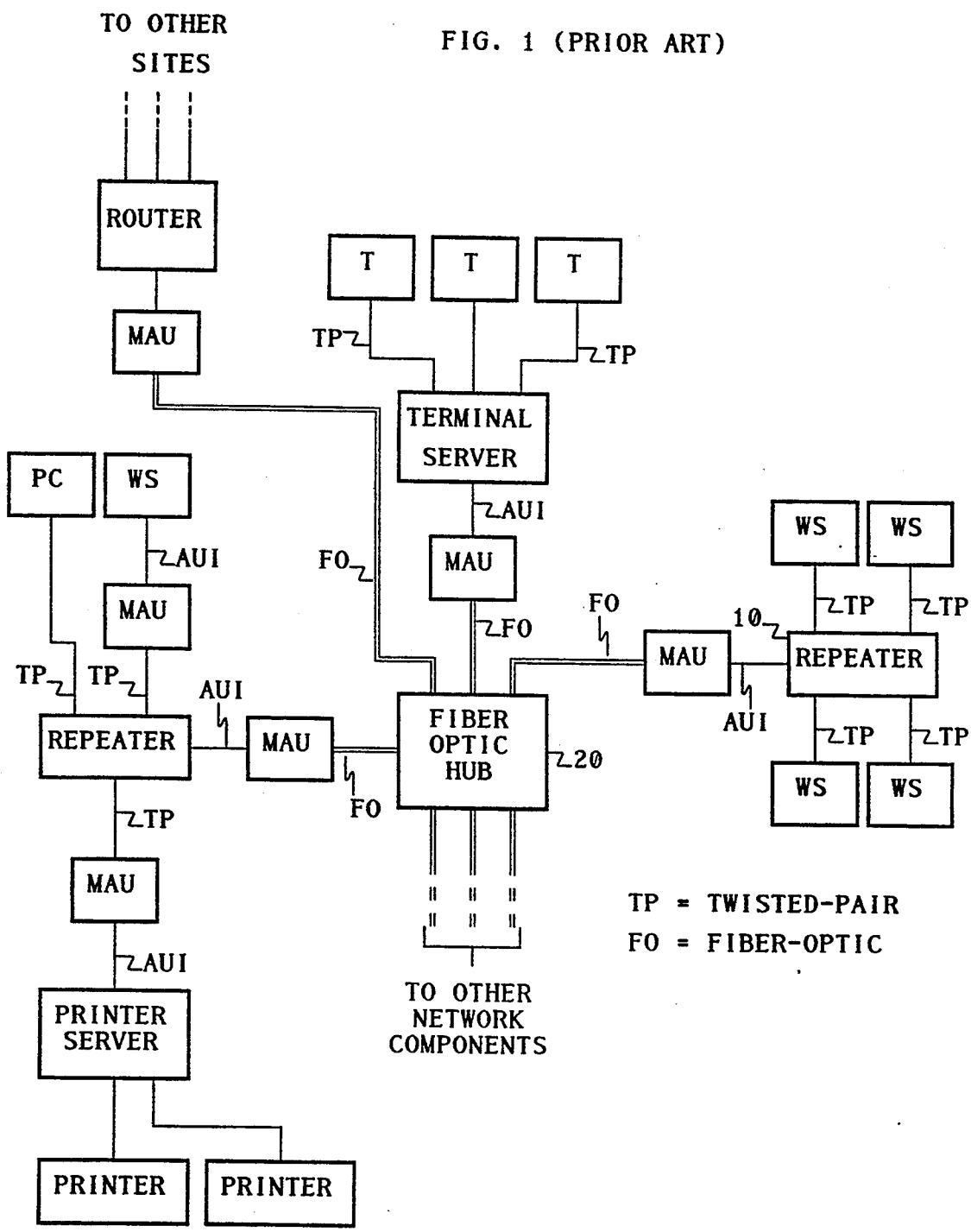
FIG. 1 is a simplified block diagram of a network configuration employing different transmission media.

As shown in the drawings for purposes of illustration, the present invention is concerned with improvements in interfacing network station equipment with network media of various types. Because stations have to be readily connectable to various media, station vendors have faced a dilemma in deciding how many interface connectors and media attachment units (MAUs) to provide with a station. A compromise solution is to provide a built-in MAU and connector for coupling to a commonly used medium, such as twisted-pair or fiber optic, and a standard interface (the AUI or attachment unit interface) to which other MAU's can be connected to provide a path to a variety of network media types. However, there is still a significant problem in that the station must be correctly switched or configured to employ the appropriate one of two media-specific circuits and connectors. In the cross-referenced application, the difficulty of two-connector designs (e.g. input-/output panel space and cost) is eliminated by the provision of a single common connector interface, but there is still the difficulty of selecting the appropriate interface circuit to use.

In accordance with the invention, a single station of the Ethernet type can automatically select which of two media-specific interfaces will be used for communication with a local area network (LAN). In an illustrative embodiment of the invention, a station is automatically configured to connect either to a network using a common standard, such as the 10BASE-T (twisted pair) standard the 10BASE-F (fiber optic) proposed standard, or to a network using a different communication medium. The automatic configuration technique of the invention is capable of selecting between two separate connectors, or of operating through a common interface, i.e. a single connector.

FIG. 1 illustrates that a network configuration conforming with the IEEE standards may utilize a number of different communication media. For example, a repeater, indicated by reference numeral 10, is shown as connected to multiple workstations (WS) by twisted-pair media, but is also connected to a fiber optic hub 20. The relatively high cost of fiber optics devices dictates selection of an external media attachment unit (MAU), to which the repeater 10 is connected through an attachment unit interface (AUI). The repeater 10, therefore, must be capable of handling multiple connector types. Other examples of connection to media through MAUs may be observed in the figure. In general, however, there are only two basic configurations by means of which a station (or repeater, or server) is coupled to a communication medium. In one type of configuration, a station appears in the figure to be directly coupled to the medium. In this case, the MAU for the medium is integral with the station equipment. In the other type of configuration, a station is connected to the medium through an external MAU, which is connected to the station through an interface (AUI).

Figure 2:
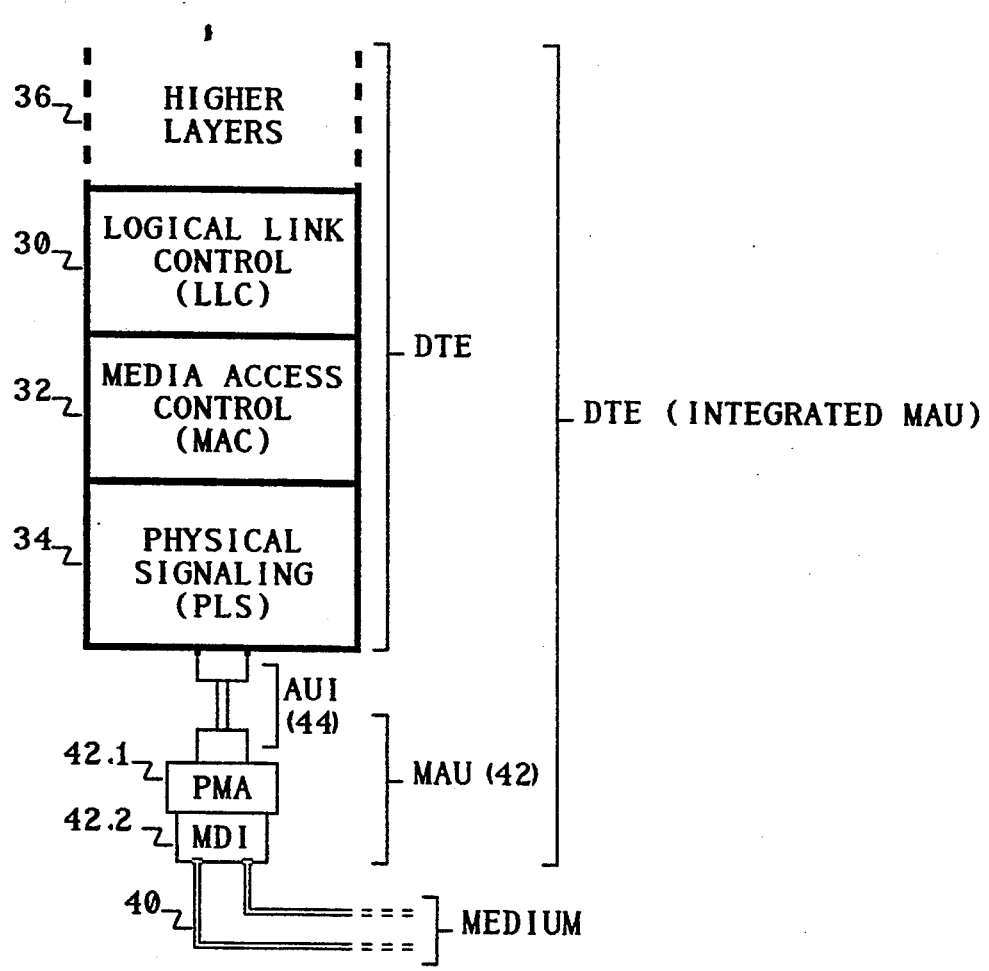
FIG. 2 is a fragmentary block diagram showing the lower layers of a CSMA/CD local area network (LAN) in accordance with ANSI/IEEE Std 802.3.

The relationship between the medium, the station equipment (or data terminal equipment, DTE), the AUI and the MAU is shown in more detail in FIG. 2. In accordance with the IEEE standards, a station connected to local area network (LAN) using the Carrier Sense Multiple Access with Collision Detection (CSMA/CD) protocol includes a logical link control (LLC) layer 30, a media access control (MAC) layer 32, and a physical signaling (PLS) layer 34, as well as higher layers, indicated at 36, logically positioned above the MAC layer. The structural and functional details of these layers are not important to the present invention, except to the extent that all of the aforementioned layers are structured independently of the type of communication medium, indicated at 40. In the general case shown, connection to the medium 40 is made through a media attachment unit (MAU) 42 structured for a specific medium type, such as for twisted pairs of conductors, optical fibers, and so forth. The MAU 42 includes a physical medium attachment (PMA) sublayer 42.1 and a medium-dependent interface (MDI) 42.2. The PMA 42.1 contains functional circuitry needed to interface with the specific medium 40, and the MDI 42.2 includes the mechanical and electrical interface with the medium. The mechanical and electrical interface between the PLS layer 34 and the MAU 42 is called the attachment unit interface (AUI), indicated at 44.

The IEEE standards define network station and repeater functions. In the context the discussion to follow, the difference between a station and a repeater element is unimportant and both elements will be encompassed by a single term, "station."

As also shown in FIG. 2, the station may be defined to include the MAU, or to exclude it. When the station includes the MAU, this simply means that the MAU is integrated into the station equipment and that the station can be directly connected to the communication medium. When the MAU is external to the station equipment, the AUI is needed to connect to a MAU selected to be compatible with a particular medium.

As can be seen from FIG. 1, a network configuration may include many different media types, but it would be costly and inefficient to integrate all possible MAUs into a station. A commonly employed compromise is to provide a built-in MAU for one medium, such as the twisted-pair medium, together with a connector conforming to standard specifications for the AUI. The AUI connector can then be used to attach an external MAU for connection to a desired medium of another type. This arrangement is shown in diagrammatic form in FIG. 3.

A typical station of the prior art includes two connectors 50 and 52 for attachment to a network. Connector 50 is a 10BASE-T connector defined in the IEEE standards as the appropriate connection for connection to a network using the Carrier Sense Multiple Access with Collision Detection (CSMA/CD) protocol and a twisted-pair communication medium. Since the 10BASE-T standard is widely used, many stations are designed and manufactured to include a 10BASE-T connector and an internal MAU 54 that conforms to 10BASE-T requirements. The other connector 52 is an AUI connector, typically of the type referred to as the 15-pin Sub-D connector. Connector 50 is wired to one set of input/output connections to a multiplexer or switch 56 through the internal MU 54, and connector 52 is wired directly to another set of input/output connections to the multiplexer or switch. The switch 56 selects from these two sets of input/output connections and provides a selected set of input/output connections to the medium-independent portion of the station equipment, specifically to the physical signaling (PLS) layer 34 (FIG. 2).

Figure 3:
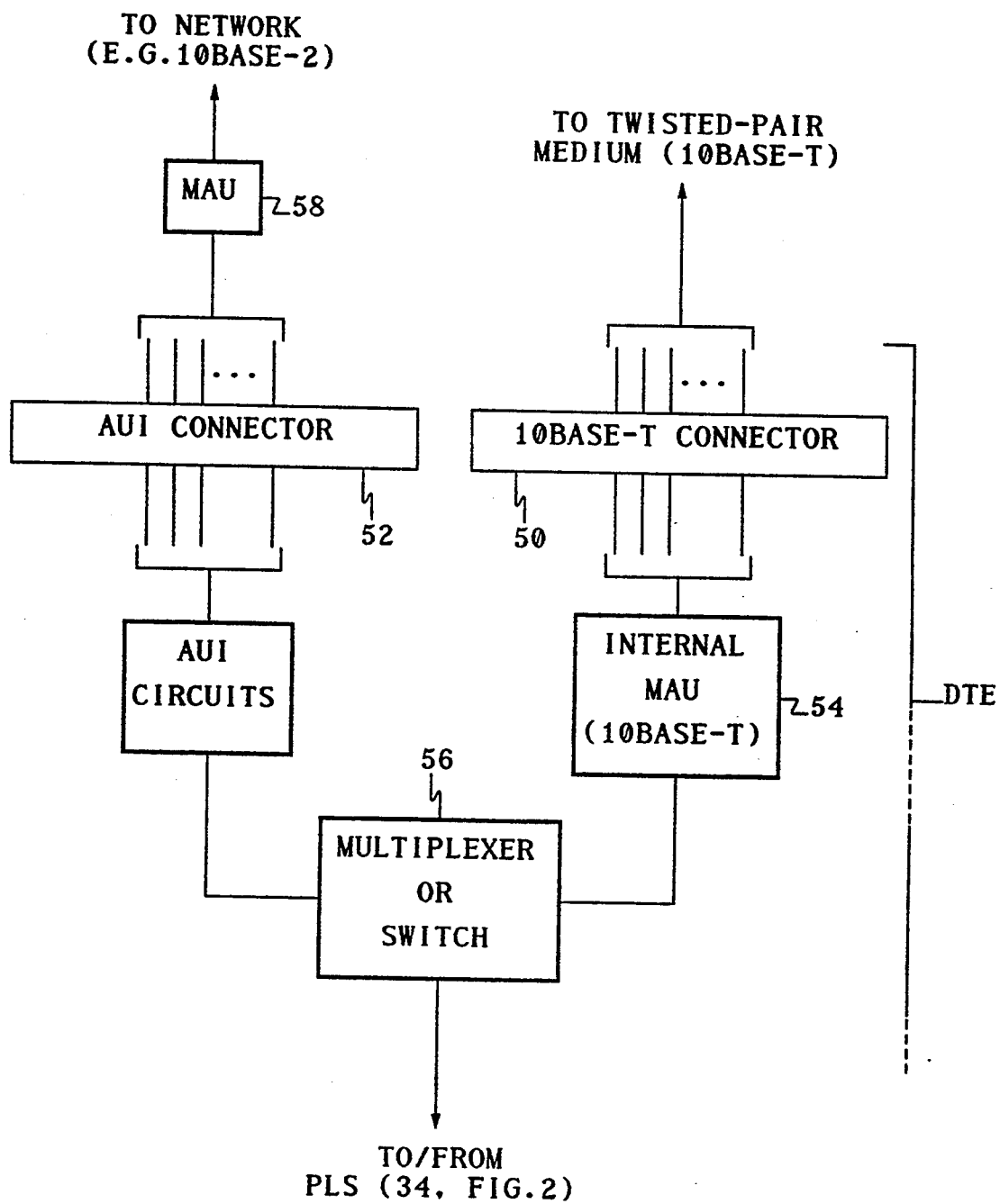
FIG. 3 is a block diagram depicting a conventional approach for connecting a station to one of two network medium types.

In the station configuration depicted in FIG. 3, connection may be made to a twisted-pair communication medium, through the 10BASE-T connector 50, or to a communication medium of any type, through the AUI connector 52 and an appropriately selected external MAU 58. The multiplexer or switch 56 may be controlled manually or through station software, to select the appropriate path for the medium to which the station is to be connected. The disadvantages of this arrangement are that the normally used AUI connector 52 (the 15-pin Sub-D connector) is cumbersome and not always reliable, that the provision of two connectors adds to the cost of the station equipment, and that the station user must still make a proper choice of connectors and switch positions. The latter problem, concerning choice of connectors, has been addressed by some vendors by simply combining the two connectors 50 and 52 into one large connector having at least as many pins as the two separate connectors. However, this has little, if any, favorable effect on equipment cost, and provides yet an additional connector standard for the customer to deal with. The cross-referenced application discloses and claims a common interface combining the functions of the two interfaces (AUI and 10BASE-T) into a single compact connector, such as the well known shielded MJ8 modular connector. The use of a single connector on the station equipment substantially reduces manufacturing cost, but raises the possibility of misconfigurations. That is to say, a station might be configured for use as a 10BASE-T station but inadvertently connected to an AUI network, or vice versa. As will be explained in more detail, pin assignments in the single connector are made with a view to minimizing adverse effects on the network that might result from misconfigurations.

The specific details of the invention will be better understood if the functions of the AUI and 10BASE-T interfaces are first briefly described. As already mentioned above, the AUI interface is used for connecting a station or a repeater to an MAU that connects directly to the communication medium. The AUI is said to be asymmetrical, i.e. electrically and mechanically the station side of the interface is different from the MAU side of the interface. The station provides output data and power to the interface, and receives input data and a collision signal. The MAU side of the AUI must drive signals for input data and a collision, while receiving output data and power from the station. Mechanically, an AUI connector cable is also asymmetrical and has a connector type at one end that will only mate with a connector on the station.

On the other hand, the 10BASE-T interface is symmetrical and is always configured as a point-to-point, duplex communication path between two 10BASE-T MAUs, each of which may be integral to a station or external to a station. In a 10BASE-T system, a collision is detected in an MAU by the simultaneous presence of transmit and receive signals on the 10BASE-T medium. A 10BASE-T cable assembly has only two signal paths, transmit data (TD) and receive data (RD), and is significantly simpler than the AUI cable assembly.

The present invention may be used in a two-connector station configuration in which one of the connectors is a 10BASE-F (fiber optic) connector. The proposed 10BASE-F standard is conceptually similar to 10BASE-T, and includes a similar link test that is used in the present invention to facilitate automatic configuration.

As mentioned earlier, the present invention is preferably used in conjunction with the common interface described and claimed in the cross-referenced application, but may also be used in a two-connector design. The manner in which pin assignments are shared in the shielded MJ8 connector of this common interface is shown in the following table.

| Shielded MJ8 Pin | 10BASE-T Interface | AUI Interface |
|---|---|---|
| 1 | TD+ | DI− |
| 2 | TD− | DI+ |
| 3 | RD+ | CI+ |
| 4 | Unused | DO+ |
| 5 | Unused | DO− |
| 6 | RD− | CI− |
| 7 | Unused | +12v |
| 8 | Unused | Return |
| Shield | Chassis ground | Chassis ground |

As shown in the table, when the 10BASE-T interface is active pins 1 and 2 of the MJ8 connector are used for transmit data (+ and −, respectively), and pins 3 and 6 are used for receive data (+ and −, respectively). Note, these pin assignments correspond to those specified for the 10BASE-T MDI. The standards also specify another pin assignment called "MDI-X" for "embedded crossover function" which, though not shown, may be used by the invention. When the AUI interface is active, pins 1 and 2 of the MJ8 connector are used for data-in signals (− and +, respectively), pins 4 and 5 are used for data-out signals (+ and −, respectively), and pins 3 and 6 are used for a collision-input signal (+ and −, respectively). Pins 7 and 8 may be used for a 12-volt power line and return line, respectively.

The MJ8 pin assignments for 10BASE-T operation conform with the IEEE standards. Basically, there are two twisted pairs of conductors, one for transmitted data and one for received data. There is no requirement for shielding, nor for power to be supplied through the interface.

The AUI standard specifies connections to fifteen pins, including four individually shielded signal pairs and a shielded pair of wires to conduct station-supplied power to the MAU. A subset of the AUI standard configuration is used in most Ethernet products, such as those manufactured by Digital Equipment Corporation. The subset, which has been adopted in the common interface of the invention, includes three signal pairs referred to as Data Out (DO±), Data In (DI±) and Collision In (CI±), one pair of power wires (12 v±), and a overall shield.

A primary requirement in choosing pin assignments is that a misconfiguration must not interrupt network operation. In the common interface of the invention, the same two pins (1 and 2) are used for receiving data from the MAU (DI±) and for transmitting 10BASE-T data to the network (TD±). Further, the AUI collision signals (CI±) appear on the same pair of pins (3 and 6) that are used to receive 10BASE-T data (RD±). Because the Data In (DI) signals and the Collision In (CI) signals in the AUI interface are generated in the MAU, i.e. the signal lines 1–3 and 6 are connected to drivers in the MAU, there is no risk to the integrity of the network if the 10BASE-T signals (the transmit-data signals) were to be inadvertently transmitted to the MAU through the AUI. Specifically, none of the 10BASE-T signals, on pins 1-3 and 6 could be received by the MAU and repeated onto the network in the event of a misconfiguration.

Another feature that reduces the effect of misconfiguration is that the AUI Data In (DI) signal is inverted before being driven onto the 10BASE-T medium, and is again inverted by the station after being received. This inversion, together with the effect of manchester encoding employed in accordance with the IEEE standards, ensures that 10BASE-T data will not be received by a station in AUI mode, or due to misconfiguration. Manchester data decoding is polarity dependent, such that a logic "1" is decoded as a logic "0" if the incorrect interface is used.

The AUI Data Out pair (DO±) is assigned to pins 4 and 5, which are not used in the 10BASE-T mode of operation. This choice is necessitated by the 10BASE-T standard, which permits two types of stations: one with the data transmit and receive signals as shown and one with their positions reversed. Moreover, 10BASE-T cable assemblies may include a "cross-over" cable, which swaps the pin positions of the transmit and receive signals from one end of the cable to the other. Therefore, if the AUI DO signal pair were to be shared with either of the 10BASE-T data signal pairs, there would be the potential for the 10BASE-T data signals to be received by the AUI attachment and incorrectly repeated onto the network. With the pin assignment as presented in the above table, the impact of misconfiguration is practically eliminated. In the event of a misconfiguration, i.e. when a selected interface is not the same as the externally connected device, then the signal DO signal driver in the station will be without connection to the external device. This pin assignment has the additional advantage that signals received by the station may be used to ascertain the nature of the attached device.

Another difficulty that the common interface anticipates is the inadvertent connection of a data terminal to a telephone line, many of which also use MJ8 modular connectors. The AUI DO signals are assigned to pins 4 and 5, which are also used in telephony for signals usually referred to as the "tip" and "ring" signals. In the event that a station is inadvertently connected to a telephone line, the telephone ring current could damage the station. In the presently preferred configuration of the invention, the connections from pins 4 and 5 are capacitively coupled to the station, to filter out telephone ring signals, which are of relatively low frequency.

The 12-volt power signals needed for the AUI interface were assigned to pins 7 and 8 because these pins are not used for 10BASE-T equipment and, as far as is known, for telephone or other applications of the MJ8 connector. Other, more detailed aspects of the common interface of the invention will be discussed below after two approaches to implementation are described.

Figure 5:
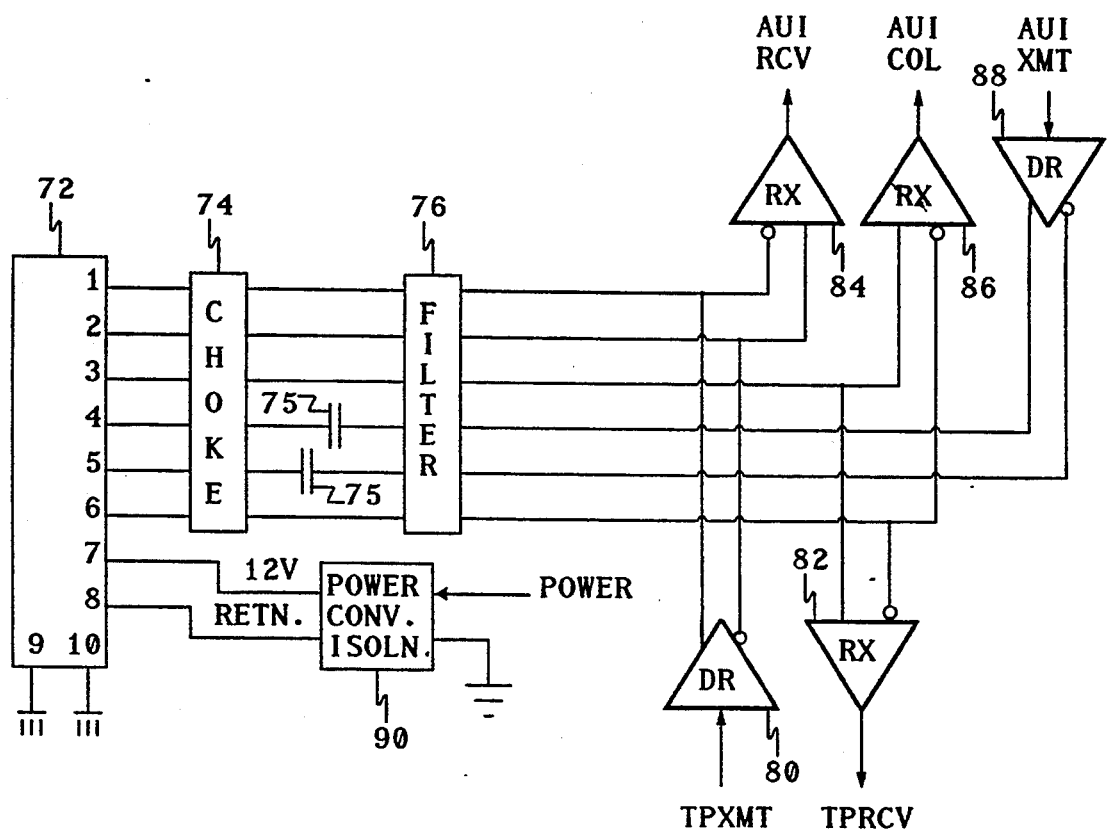
FIG. 5 is a block diagram depicting a first embodiment of the present invention, using a custom interface chip to interface with station equipment.

FIG. 5 depicts the details of combining the signals of an AUI and 10BASE-T connector, for use in one embodiment of the present invention. The common interface includes a shielded MJ8 connector 72 having the same pin assignments as discussed above, conventional choke and filter circuits (74 and 76, respectively) connected in signal lines from pins 1-6 of the connector. For the twisted-pair interface, the circuit shows the final driver 80 for the twisted-pair transmit data signal, to produce the TD± signals on signal lines corresponding to pins 1 and 2 of the connector 72, and a receiver 82 for generating a twisted-pair receive signal from RD ±inputs received over signal lines corresponding to pins 3 and 6 of the connector. Only the final driver and first receiver for 10BASE-T are shown. Additional circuitry implementing the 10BASE-T function is not shown in FIG. 5, but is discussed later. For the AUI, FIG. 5 includes a receiver 84 for generating an AUI receive data signal from DI±inputs received over signal lines corresponding to pins 1 and 2 of the connector 72, a receiver 86 for generating an AUI collision signal from CI±inputs received over signal lines corresponding to pins 3 and 6 of the connector, and a driver 88 for the AUI transmit data signal, to produce the DO±signals on signal lines corresponding to pins 4 and 5 of the connector.

As also shown in FIG. 5, the lines corresponding to pins #4 and #5 between the choke 74 and the filter 76 each contain a series capacitor, indicated by reference numeral 75, which may have a capacitance of approximately 0.2 microfarad. The capacitors 75 prevent coupling of low-frequency ringing signals from a telephone circuit to which the interface might be inadvertently connected. Another feature of the circuit shown in FIG. 5 is that inputs to the AUI receiver 84 are inverted with respect to the normal 10BASE-T connection, to prevent reception of 10BASE-T data, which is conducted from pins #1 and #2 of connector 72 when a 10BASE-T is misconfigured external to the station.

Also shown in FIG. 5 is a power supply 90 for supplying 12-volt power, optionally, to pins 7 and 8 of the connector 72. The power supply is designed to meet the isolation requirements of the 10BASE-T standard and is protected against short-circuit and over-voltage faults. The power supply function can be removed from the station equipment if there is a concern that any external components, such as in telephone equipment, might react adversely to a 12-volt line level in a misconfiguration condition. In such a case, an external power supply can be used, supplying the 12-volt power through an external cable adapter. Then the 12-volt supply will be provided only to the AUI media and the issue of adverse effects of a misconfiguration is avoided.

The 10BASE-T standard specifies electrical isolation requirements for the signals lines, and these requirements are met in the interface of the invention by means of the filter 76, which provides up to a 3 kv isolation level and is similar in design to a conventionally used 10BASE-T component. The isolation thus provided exceeds the requirements of the AUI specification.

Figure 6:
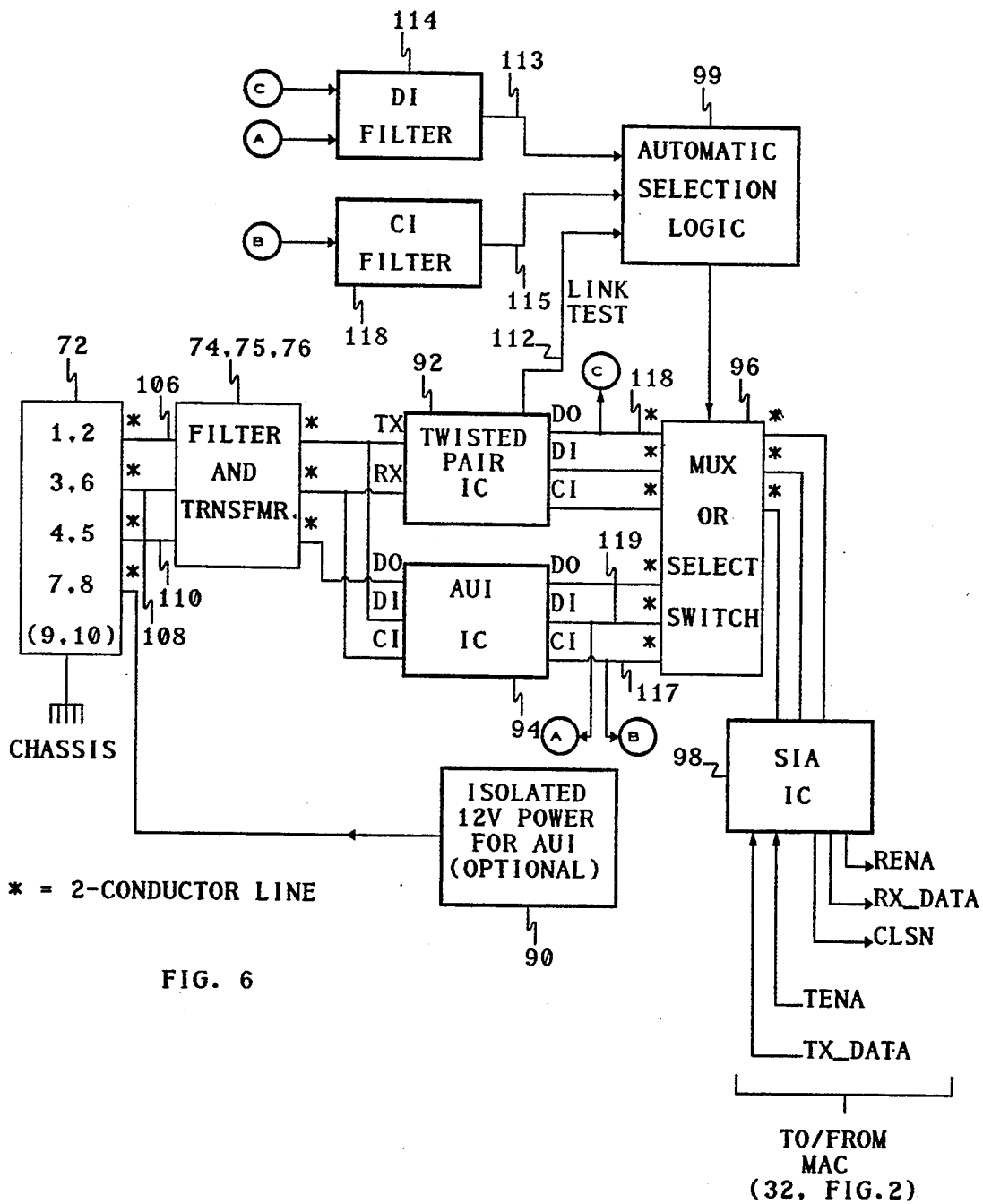
FIG. 6 is a block diagram depicting a second embodiment of the present invention, using existing interface chips for twisted-pair and AUI interfaces.

FIG. 6 shows an implementation of a station including the common interface discussed above, using off-the-shelf interface chips 92 and 94. As in FIG. 5, the signal lines 1-6 of the MJ8 connector 72 are connected to a filter and transformer, referred to as 74, 75, 76. Then the lines are connected in appropriate pairs to the chips 92 and 94. Chip 92 is a twisted-pair integrated circuit (TPIC) that provides the MAU function for 10BASE-T and is available in the industry from several vendors. Chip 94 is an AUI integrated circuit (AUI-IC), which provides AUI driver and receiver functions and is also widely available, under the designation 75ALS085. The TPIC 92 is connected to signals corresponding to pins 1 and (for TD±) and to signals corresponding to pins 3 and 6 (for RD±). The chip derives the TD signals from a Data Out (DO) signal, derives a Data In (DI) signal from the RD signals, and derives a Collision In (CI) signal from the states of both the TD and RD signals. The DO, DI and CI signals are all coupled to a multiplexer (MUX) or selector switch 96.

The AUI-IC 94 performs a similar function for the AUI. The AUI-IC is connected to pins 4 and 5 (the DO signals), pins 1 and 2 (the DI signals) and pins 3 and 6 (the CI signals). These three signal pairs are coupled from the AUI-IC 94 to the MUX or selector switch, the function of which is to select one set of signals, either those connected to the TPIC 92 or those connected to the AUI-IC 94, for connection to the another standard chip 98, referred to as the SIA IC (Serial Interface Adapter) IC, which is the first-encountered chip in the media-independent portion of the station equipment. The SIA IC 98 performs conventional Ethernet encoding and decoding functions, and is available as AMD part number 7992.

The MUX or selector switch 96 may take the form of a manual gang switch, switchable between two positions to select either the 10BASE-T mode or the AUI mode of operation. The circuit of FIG. 6 will change form slightly depending on the type of switching that is used. For a gang switch, the AUI chip may not be needed. A gang switch will commonly preserve the analog character of the signals that are switched. The DO, DI, and CI signals from/to and SIA chip are often not simple logic levels, but include the AUI driver and receiver functions. The SIA chip may be directly connected to a signal isolation transformer for AUI. The AUI IC 94 of FIG. 6 would not be included for cost reasons.

Alternatively, the switching device 96 may take the form of an electronic switch operable by logic signals and commonly called a MUX. A MUX typically switches logic signals and the AUI IC 94 is required as shown in FIG. 6 to provide the analog driver/receiver functions for the AUI interface. The extra component is included in the preferred embodiment of the invention to allow electrical control of the switch function 96. The invention is described in terms of existing components. An alternative implementation would have a single VLSI chip to implement functions for AUI and 10BASE-T, including items 92, 94 and 96 in one part. This reduces the cost, as interfaces between these three parts involve a lot of component pins. In particular, twenty-four component pins are eliminated for the single-part implementation.

The MUX or selector switch 96 may be electronically switchable under software control, as directed by the station user. In the preferred embodiment of the invention, the MUX or selector switch is an electronic switch controlled automatically as a result of signals that sense the nature of the device attached to the connector 72. This autoconfiguration process involves having the station transmit certain signals and observe the signals received from the communication medium and the attached device; then modify its mode of operation as appropriate. This process is controlled by automatic selection logic 99, which transmits control signals to the MUX or selector switch 96.

Two factors make autoconfiguration possible. One is the use of a signal path for the AUI data transmit function (the DO±signals) that is never connected to a 10BASE-T receiver function. This allows the station to transmit a signal without first knowing the external configuration of the equipment. The received response may then be observed and the operational mode may be modified depending on the nature of the response.

The second factor that makes autoconfiguration possible is that signal activity by an attached device is provided by the AUI and 10BASE-T protocols. In particular, and as viewed from the station end of a connection, the 10BASE-T protocol provides for "link test pulses" to be transmitted onto the communication medium and received by the station. The AUI specification requires the MAU to "echo" transmitted data (DO) from the station onto the station's receive data path (DI). Using these facts and local knowledge of the station transmitter activity, the station may ascertain the presence and nature of the attached device. A specific procedure for achieving this function is discussed below.

Figure 4A:
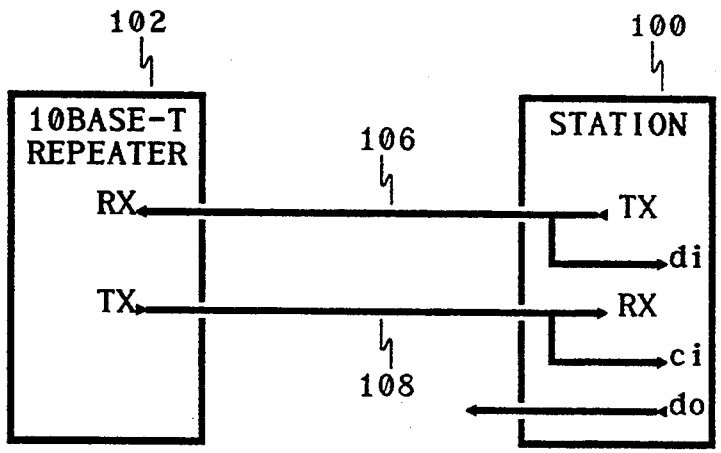
FIG. 4A is a diagrammatic view showing operation of a station in 10BASE-T mode.
Figure 4B:
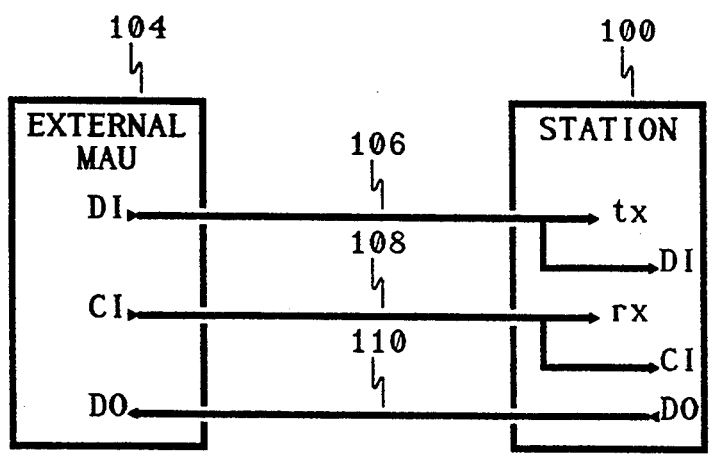
FIG. 4B is a diagrammatic view showing operation of a station in AUI mode.

FIGS. 4A and 4B show the signal transmission paths for two possible configurations of a station 100. In FIG. 4A the station 100 is shown connected to a 10BASE-T repeater 102, and in FIG. 4B the station is shown connected to an external MAU 104. The convention adopted in FIGS. 4A and 4B is that presently active signals are shown in uppercase characters, while inactive signals are shown in lowercase characters.

When operating in 10BASE-T mode (shown in FIG. 4A), the station 100 transmits data over line 106, which has a signal TX at the station end and a signal RX at the repeater end. The station receives data over line 108, which has a signal TX at the external MAU end and a signal RX at the station end. In the AUI mode of operation (shown in FIG. 4B), line 106 carries data input from the external MAU 104, shown as signal DI, and line 108 carries a collision input signal CI from the external MAU. Line 110 carries data output, signal DO from the station to the external MAU.

As also shown in FIG. 6, the automatic selection logic 99 has three principal inputs: a link test signal on line 112 from the twisted pair IC 92, a filtered DI status signal on line 113 from a DI filter circuit 114, and a filtered CI status signal on line 115 from a CI filter circuit 116. The DI filter circuit 114 has as inputs the signal (through connection C) from circuit 118 (FIG. 6), and the signal (through connection A) from circuit 119 (FIG. 6). The CI filter circuit has only one input, the collision input (CI) signal derived (through connection B) from circuit 117 (FIG. 6) from the CI line between the AUI IC 94 and the MUX 96. Understanding how the automatic selection logic 99 operates requires a more detailed discussion of the filter circuits 114 and 116, which are shown in FIGS. 8A and 8B, respectively.

Figure 8A:
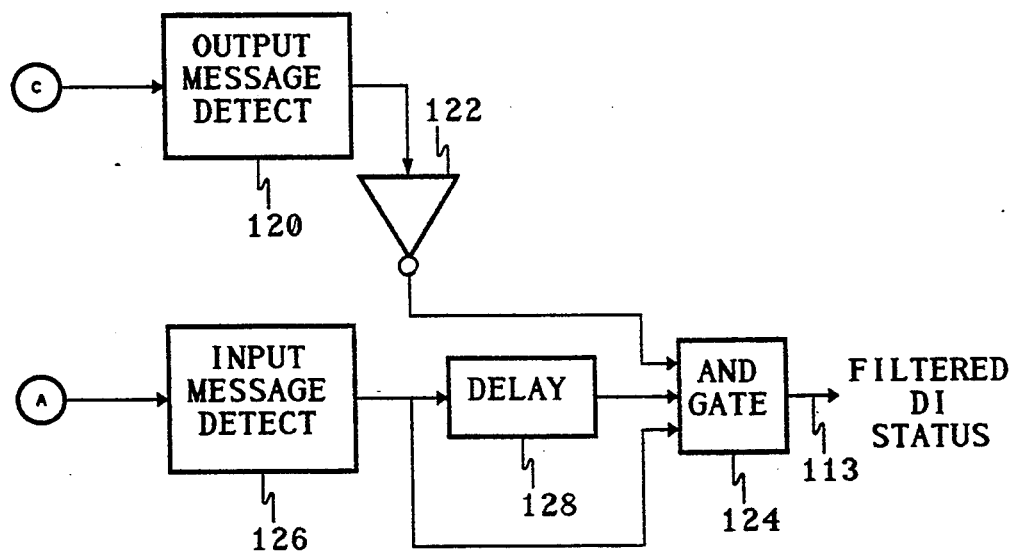
FIGS. 8A and 8B are schematic diagrams of filter circuits to provide a filtered data input (DI) status and a filtered collision input (CI) status, respectively, for the AUI interface.

The DI filter circuit in FIG. 8A detects the presence of a data input signal (on line 106 in FIG. 4) when the station is not transmitting either a packet or a link test pulse. An Output Message Detect function 120 detects the presence of an outgoing message (also called a transmit packet) using the signals (through connection C) from circuit 118 (FIG. 6). When an output message is present, the Output Message Detect function 120 drives its output line to a logic high signal. This signal is inverted by an invertor 122 and is input to an AND gate 124. Therefore, the AND gate 124 is disabled when there is an output message on circuit 118. An Input Message Detect function 126 looks for the presence of an input message from the twisted-pair signal TX. The Input Message Detect function 126 monitors the circuit 119 (connection A) for input messages and link test pulses, and produces a logic high signal when either an input message or a link test pulse is present. The signal is connected both as a direct input to the AND gate 124, and as a delayed input after processing by a delay circuit 128. The effect of the delay circuit 128 is to filter out any signal of less that one microsecond in duration, which effectively filters out signals produced by link test pulses. Thus, the Filtered DI Status does not respond to the output message transmitted by this station and the link test pulses from any source.

Figure 8B:
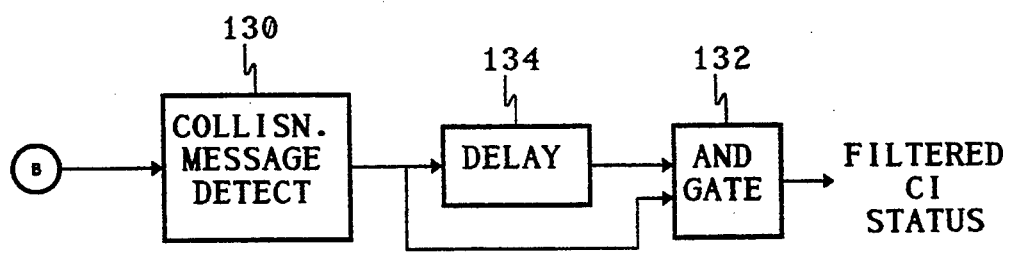

The CI filter circuit in FIG. 8B filters out messages that are shorter than one microsecond, which includes any link test pulses. A Collision Message Detect function 130 monitors the CI signal on circuit 117 (connection B). The Collision Message Detect function 130 drives its output to a logic high signal when it detects activity on its input. The signal is connected both as a direct input to an AND gate 132, and as a delayed input after processing by a delay circuit 134. The effect of the delay circuit 134 is to filter out any signal less than one microsecond in duration, which effectively filters out signals produced by link test pulses. Thus, the Filtered CI Status does not respond to 10BASE-T link test pulses.

When the station is configured to operate in 10BASE-T mode, but the filtered DI status signal is active or high, the station is receiving a signal over line 106 (FIG. 4A). Since line 106 is a transmit data line in 10BASE-T mode, this condition indicates a misconfiguration.

For a misconfiguration in which the station (100 in FIG. 4A) is mistakenly in AUI mode, without the benefit of the CI filter circuit 116, the station could falsely interpret link test pulses from the 10BASE-T repeater 102 as collision signals. The filter circuit 116 avoids this potential difficulty.

Figure 7:
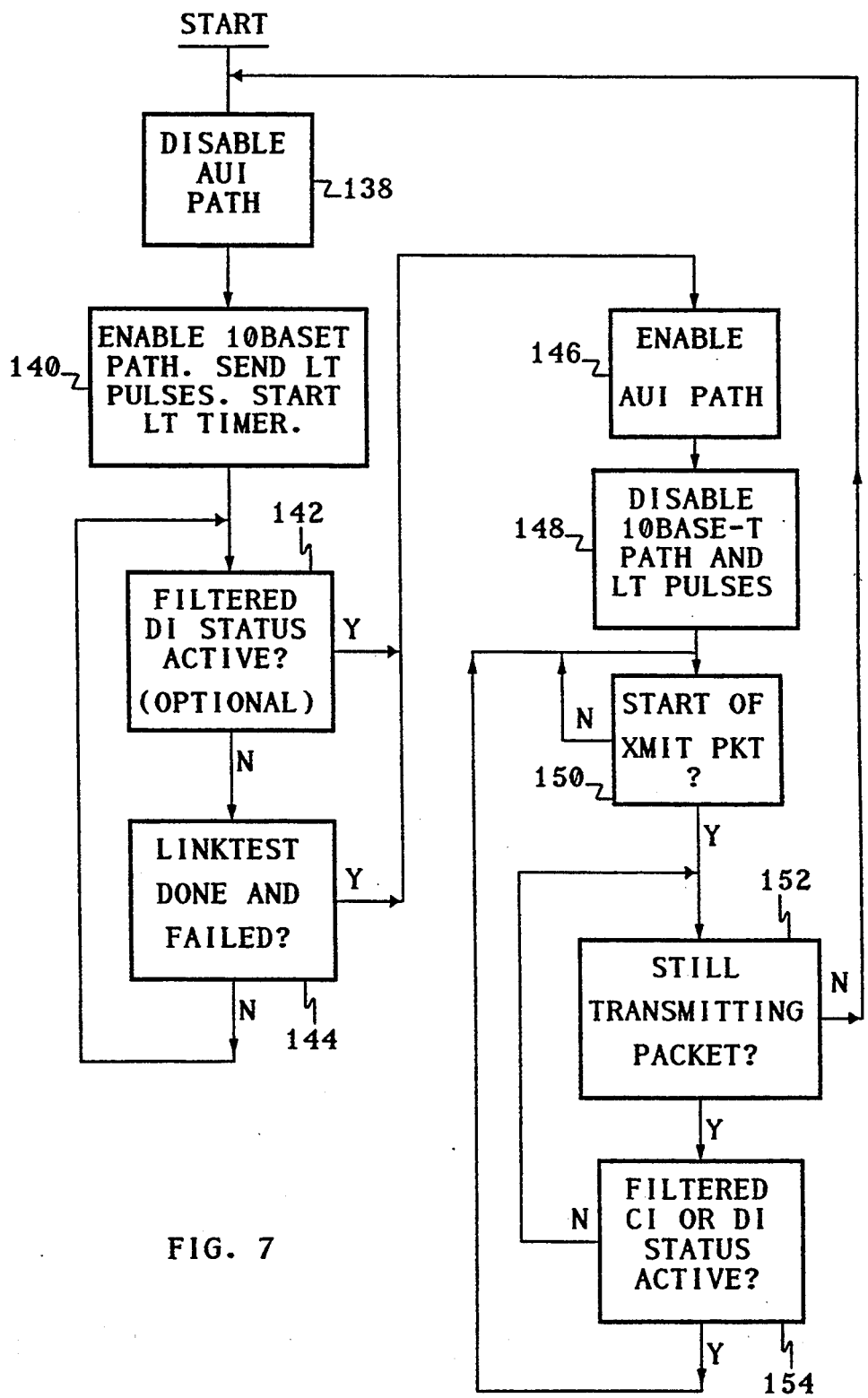
FIG. 7 is flowchart of an autoconfiguration algorithm in accordance with the present invention, as applied to autoconfiguration of a common interface.

Operation of the autoconfiguration algorithm can best be described in terms of a flowchart, shown in simplified form in FIG. 7. It will be understood that the algorithm may be implemented in hard-wired form, or as software or firmware. The algorithm operates in two main loops, corresponding to the two modes of operation shown in FIGS. 4A and 4B. The autoconfiguration algorithm is illustrated as starting operation in the 10BASE-T mode, in block 138, although operation could just as well have started in the AUI mode. As shown in blocks 138 and 140, respectively, first the AUI path is disabled and the 10BASE-T path is enabled. Enabling one mode or the other is accomplished by actuating an electronically controlled switch, such as the switch 56 (FIG. 3) or the switch 96 (FIG. 6). After the 10BASE-T mode is enabled, the algorithm initiates a standard link test procedure, by transmitting link test (LT) pulses and starting a link test timer, as also indicated in block 140. This is a standard 10BASE-T test defined in the IEEE standards. Basically, if a response to the LT is not received by the station within a preselected time it is assumed that no 10BASE-T connection has been established with the network.

The next step in the 10BASE-T loop, shown in block 142, is to test for the presence of a data input signal (on line 106 in FIG. 4) using the DI filter function. This condition, if present, would indicate incorrect 10BASE-T operation. The test made in block 142 is performed by examining the state of a filtered DI status signal output from the DI filter circuit 114 (FIG. 6). For purposes of the present invention, the block 142 test is optional, since the next test (block 144) is sufficient to determine the appropriate mode of operation. A less costly implementation is obtained if the test of block 142 is omitted. In block 144, it is determined whether the link test is complete and whether the test failed. If so, the station is assumed to be not connected to a 10BASE-T network. If the test, or tests, of blocks 142 and 144 determine that the network is operating in 0BASE-T mode, the test, or tests, are repeated and the algorithm stays in the 10BASE-T loop on the left-hand side of FIG. 7.

If either of the tests of blocks 142 and 144 determines that the network is not operating in 10BASE-T mode, the AUI-mode loop is entered, beginning at block 146, which enables the AUI path. As shown in block 148, the 10BASE-T path of operation is simultaneously disabled, and action is taken to disable further transmission of LT pulses. If the invention is used in conjunction with two connectors, as in the configuration of FIG. 3, the latter step may be omitted and LT pulses may be tranmsitted to the 10BASE-T connector even while the station is operating in AUI mode. The next step, shown in block 150, is to wait for the start of a transmitted packet. Once a packet begins transmitting in AUI mode, such as on the DO line 110 in FIG. 6, the algorithm monitors the data input (DI) and collision input (CI) signals on lines 106 and 108. At some time during the transmission of a packet, one of these lines should become active, indicating either echoed data or a collision for access to the network. If the packet transmission ends without activity on the DI or CI lines, there is assumed to be no operation in the AUI mode. The test in block 152 determines if packet transmission is still taking place, and is applicable to packet transmissions that take a longer time than the roundtrip delay of the network. If a packet transmission is still taking place, the step in block 154 checks the filtered DI status and filtered CI status. If filtered DI or filtered CI activity is found, the algorithm returns to waiting for the start of another packet, i.e. to block 150. If no filtered DI or CI activity is found, the algorithm keeps checking for the end of the transmitted packet (in block 152). Thus, so long as the packet is still being transmitted there will be repeated tests for filtered DI and CI activity. If any such activity is detected, the algorithm will wait for the next packet (in block 150), and the AUI path will remain enabled. If no filtered DI or CI activity is detected during the transmission of an entire packet, the result of the test in block 152 will be negative and control will return to block 138, to enable the 10BASE-T mode of operation.

From the foregoing description of FIG. 7, it will be apparent that the autoconfiguration algorithm will switch automatically to the appropriate mode of operation, and will continue to test for proper operation in the selected mode. The algorithm may be implemented in software form, but is probably best implemented in hardware form in the station network interface, near the mode switch 56 or 96. Ideally, the algorithm should be integrated with the switch and the 10BASE-T and AUI interface logic, on a single chip.

Figure 9:
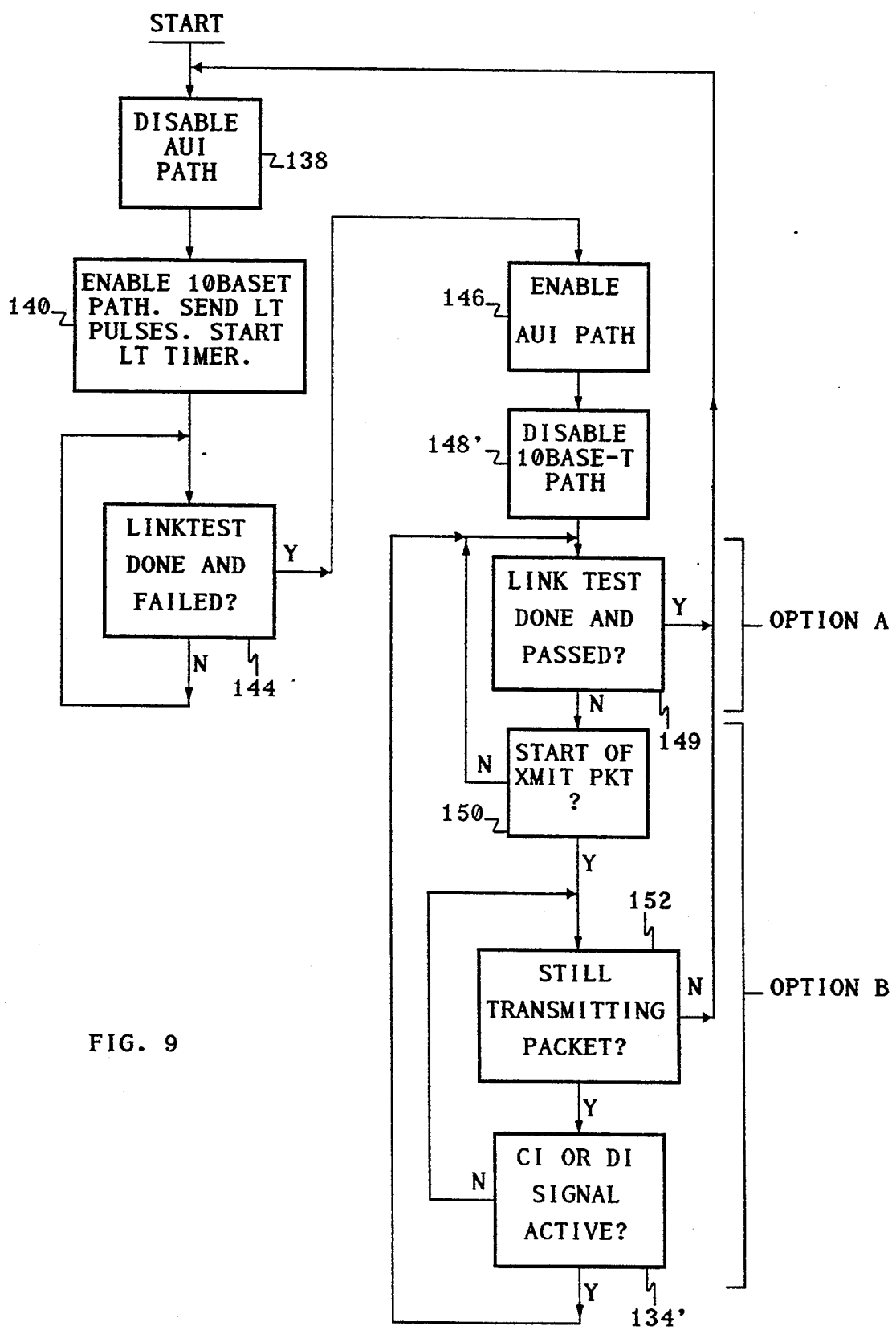
FIG. 9 is a flowchart similar to FIG. 7, but intended for application to a two-connector station configuration.

FIG. 9 is a flowchart similar to FIG. 7, but more specifically designed to implement the invention in a station having two connectors rather than a single interface. In this embodiment of the invention, since there is no sharing of pin assignments there is no need to filter the DI and CI signals in the manner described with reference to FIGS. 8A and 8B. Instead, the filter circuits 114 and 116 are omitted from FIG. 6 and automatic selection logic receives as inputs the unfiltered DI and CI signals.

The left-hand side (the 10BASE-T loop) of FIG. 9 is closely similar to the same loop in FIG. 7, except that there is no optional test of the filtered DI status (block 142 in FIG. 7). The only test for continued proper operation in 10BASE-T operation is to determine whether the link test was properly completed (block 144). If not, control is transferred to the AUI test loop, beginning with block 146. Then block 148' disables the 10BASE-T path, but does not need to disable the generation of LT pulses. There are two different options, designated Option A and Option B in FIG. 9, for determining whether the network is operating in 10BASE-T mode. The two options may be both used, either one may be used alone. Under Option A, shown in block 159, it is determined whether the link test has been completed and passed. If so, the network is operating in 10BASE-T mode and control is transferred back to the 10BASE-T loop, beginning at block 138. If not, the test will be repeated if only Option A is employed, or the tests of Option B will be performed if this option is being used. Option B includes block 150 (waiting for the start of a transmit packet), block 152 (checking to see if a packet is still being transmitted), and block 134', which checks to determine whether there are active CI or DI signals. This block differs from block 134 of FIG. 7 in that unfiltered CI and DI signals are used in the test. If neither CI nor DI is found to be active during the transmission of a packet, the mode is assumed to be 10BASE-T and control is transferred to block 138. Otherwise, testing continues using Option A or Option B, or both.

The logic explained with reference to FIG. 9 is equally valid for selecting between AUI and 10BASE-F modes of operation. The proposed standard 10BASE-F mode employs a link validity test similar to the one employed for 10BASE-T. Therefore, the link test can be used to determine whether the network is operating in 10BASE-F mode, as depicted in FIG. 9.

It will be appreciated from the foregoing that the present invention represents a significant advance in the field of network communication, and particularly in the design of network station equipment that will interface conveniently with a variety of media types. The invention provides for automatic selection between two modes of operation, such as between the commonly used 10BASE-T and AUI modes, or between 10BASE-F and AUI modes. The selection is made on the basis of tests performed to determine proper operation in the currently selected mode. If the currently selected mode is inoperative, the other mode is selected. The invention may be used in a station having separate connectors for the two modes, to choose which connector will operate as the communications port for the station, or in a station having a common interface for the two modes, to determine which protocol operates over the common interface.

It will also be appreciated that specific embodiments of the invention have been described in detail by way of illustration, and that modifications may be made without departing from the spirit and scope of the invention. Accordingly, the invention is not to be limited except as by the appended claims.

We claim:

1. For use in a station that is connectable to more than one type of communication medium in a network that employs a Carrier Sense Multiple Access with Collision Detection (CSMA/CD) protocol, a method for automatically configuring the station for a particular communication medium, the method comprising the steps of:
    enabling a first mode of operation of the station;
    determining whether the station operates properly in the first mode;
    continuing operation in the first mode if proper operation in that mode is determined;
    enabling a second mode of operation if proper operation in the first mode is not determined;
    determining whether the station operates properly in the second mode;
    continuing operation in the second mode if proper operation in that mode is determined; and
    returning to the first recited step of enabling the first mode of operation, if proper operation in the second mode is not determined.

2. A method as defined in claim 1, wherein:
    the station has a common interface for connection to different communication media; and
    the steps enabling the first mode of operation and enabling the second mode of operation include selecting an interface circuit for connection to the common interface.

3. A method as defined in claim 1, wherein:
    the station has two separate connectors for connection to different communication media; and
    the steps of enabling the first mode of operation and enabling the second mode of operation include selecting one of the two connectors and a corresponding interface circuit.

4. A method as defined in claim 1, wherein:
    the second mode of operation is in accordance with a standard attachment unit interface (AUI) for connection to a different medium type through an appropriate medium attachment unit (MAU).

5. A method as defined in claim 4, wherein:
    the first mode of operation is in accordance with 10BASE-T standards using a twisted-pair communication medium.

6. A method as defined in claim 4, wherein:
    the first mode of operation is in accordance with 10BASE-F standards using a fiber optic communication medium.

7. A method as defined in claim 1, wherein:
    the step of determining whether the station operates properly in the first mode includes transmitting link test pulses onto the network and waiting for an appropriate response.

8. A method as defined in claim 2, wherein:
    the step of determining whether the station operates properly in the first mode further includes testing for the presence of data input signals when the station is not actively transmitting, whereby the input data signals are indicative of network operation in the second mode.

9. A method as defined in claim 8, wherein:
    the step of determining whether the station operates properly in the first mode includes transmitting link test pulses onto the network and waiting for an appropriate response; and
    the step of testing for the presence of data input signals includes filtering the data signals to eliminate link test pulses that could otherwise be mistaken for data signals.

10. A method as defined in claim 1, wherein:
    the second mode is in accordance with an attachment unit interface (AUI) standard; and
    the step of determining whether the station operates properly in the second (AUI) mode includes detecting the presence of a received data input signal or a received collision signal while transmitting a packet of data from the station, whereby the absence of a data input signal or a collision signal indicates improper operation in the second (AUI) mode.

11. For use in a station that is connectable to more than one type of communication medium in a network that employs a Carrier Sense Multiple Access with Collision Detection (CSMA/CD) protocol, a method for automatically configuring the station for a particular communication medium, the method comprising the steps of:
    (a) enabling operation of the station in accordance with a 10BASE-T protocol to communicate with a twisted-pair communication medium;
    (b) initiating a link test by transmitting link test pulses and starting a link test timer;
    (c) continuing operation in the 10BASE-T mode if the link test is completed successfully;
    (d) enabling operation in accordance with a standard attachment unit interface (AUI) mode of operation, for connection to a different medium type, if the link test is not completed successfully;
    (e) determining whether the station is operating properly in the AUI mode;
    (f) continuing operation in the AUI mode if proper operation in that mode is detected; and
    (g) enabling the 10BASE-T mode of operation if proper operation in the AUI mode is not detected.

12. A method as defined in claim 11, wherein:
    the station has a common interface for connection to different communication media; and
    the method further comprises the steps of
        (h) after step (b), when the station is operating in accordance with the 10BASE-T protocol, checking for the presence of data input signals indicative of network operation in the AUI mode, and (i) upon detection of data input signals in the previous step (h), continuing with the execution of step (d), to enable operation in the AUI mode.

13. A method as defined in claim 12, wherein:
the step of checking for the presence of input signals includes filtering input signals to eliminate link test pulses that might otherwise be identified as input signals.

14. For use in a station having at least two connectors, for connection to more than one type of communication medium in a network that employs a Carrier Sense Multiple Access with Collision Detection (CSMA/CD) protocol, a method for automatically configuring the station for a particular communication medium, the method comprising the steps of:
(a) enabling operation of the station in accordance with a 10BASE-F protocol to communicate with a fiber optic communication medium;
(b) initiating a link test by transmitting link test pulses and starting a link test timer;
(c) continuing operation in the 10BASE-F mode if the link test is completed successfully;
(d) enabling operation in accordance with a standard attachment unit interface (AUI) mode of operation, for connection to a different medium type, if the link test is not completed successfully;
(e) determining whether the station is operating properly in AUI mode;
(f) continuing operation in the AUI mode if proper operation in that mode is detected; and
(g) enabling the 10BASE-F mode of operation if proper operation in the AUI mode is not detected.

15. A method as defined in claim 14, wherein:
the step of determining whether the station is operating properly in AUI mode includes detecting received data or collision signals while transmitting in AUI mode.

16. For use in a station that is connectable to more than one type of communication medium in a network that employs a Carrier Sense Multiple Access with Collision Detection (CSMA/CD) protocol, apparatus for automatically configuring the station for a particular communication medium, the apparatus comprising:
means for enabling a first mode of operation of the station;
means for determining whether the station operates properly in the first mode;
means for continuing operation in the first mode if proper operation in that mode is determined;
means for enabling a second mode of operation if proper operation in the first mode is not determined;
means for determining whether the station operates properly in the second mode; and
means for continuing operation in the second mode if proper operation in that mode is determined, and returning control to the means for enabling the first mode of operation, if proper operation in the second mode is not determined.

17. Apparatus as defined in claim 16, wherein:
the station has a common interface for connection to different communication media; and
the means for enabling the first mode of operation and the means for enabling the second mode of operation include means for selecting an interface circuit for connection to the common interface.

18. Apparatus as defined in claim 16 wherein:
the station has two separate connectors for connection to different communication media; and
the means for enabling the first mode of operation and the means for enabling the second mode of operation include means for selecting one of the two connectors and a corresponding interface circuit.

19. Apparatus as defined in claim 16, wherein:
the second mode of operation is in accordance with a standard attachment unit interface (AUI) for connection to a different medium type through an appropriate medium attachment unit (MAU).

20. Apparatus as defined in claim 19, wherein:
the first mode of operation is in accordance with 10 BASE-T standards using a twisted-pair communication medium.

21. Apparatus as defined in claim 19, wherein:
the first mode of operation is in accordance with 10BASE-F standards using a fiber optic communication medium.

22. Apparatus as defined in claim 16, wherein:
the means for determining whether the station operates properly in the first mode includes means for transmitting link test pulses onto the network and waiting for an appropriate response.

23. Apparatus as defined in claim 17, wherein:
the means for determining whether the station operates properly in the first mode further includes means for testing for the presence of data input signals when the station is not actively transmitting, whereby the data input signals are indicative of network operation in the second mode.

24. Apparatus as defined in claim 23, wherein:
the means for determining whether the station operates properly in the first mode includes means for transmitting link test pulses onto the network and waiting for an appropriate response; and
the means for testing for the presence of data input signals include means for filtering data input signals to eliminate link test pulses that would otherwise be identified as input data.

25. Apparatus as defined in claim 16, wherein:
the step of determining whether the station operates properly in the second mode includes means for detecting the presence of a received data input signal or a received collision signal while transmitting a packet of data from the station, whereby the absence of a data input signal or a collision signal indicates improper operation in the second mode.

26. Apparatus as defined in claim 25, wherein:
the means for determining whether the station operates properly in the first mode includes means for transmitting link test pulses onto the network and waiting for an appropriate response;
the station has a common interface for connection to different communication media; and
the means for detecting the presence of received data or collision signals includes filter means to eliminate link test pulses.

27. Apparatus as defined in claim 25, wherein:
the station has two separate connectors for connection to different communication media; and
the means for detecting the presence of received data or collision signals uses unfiltered received data and collision signals.

28. For use in a station that is connectable to more than one type of communication medium in a network that employs a Carrier Sense Multiple Access with Collision Detection (CSMA/CD) protocol, apparatus for automatically configuring the station for a particular communication medium, the apparatus comprising:
- (a) means for enabling operation of the station in accordance with a 10BASE-T protocol to communicate with a twisted-pair communication medium;
- (b) means for initiating a link test by transmitting link test pulses and starting a link test timer;
- (c) means for continuing operation in the 10BASE-T mode if the link test is completed successfully;
- (d) means for enabling operation in accordance with a standard attachment unit interface (AUI) mode of operation, for connection to a different medium type, if the link test is not completed successfully;
- (e) means for determining whether the station is operating properly in the AUI mode; and
- (f) means for continuing operation in the AUI mode if proper operation in that mode is detected, and returning control to the means for enabling the 10BASE-T mode of operation, if proper operation in the AUI mode is not detected.

29. Apparatus as defined in claim 28, and further comprising:
- (g) a common interface for connection to different communication media;
- (h) for use when the station is operating in accordance with the 10BASE-T protocol, means for checking for the presence of data input signals indicative of network operation in the AUI mode; and
- (i) for use upon detection of data input signals by the previously recited element (h), means for returning control to the means (d), for enabling operation in the AUI mode.

30. For use in a station having at least two connectors, for connection to more than one type of communication medium in a network that employs a Carrier Sense Multiple Access with Collision Detection (CSMA/CD) protocol, apparatus for automatically configuring the station for a particular communication medium, the apparatus comprising:
- (a) means for enabling operation of the station in accordance with a 10BASE-F protocol to communicate with a fiber optic communication medium;
- (b) means for initiating a link test by transmitting link test pulses and starting a link test timer;
- (c) means for continuing operation in the 10BASE-F mode if the link test is completed successfully;
- (d) means for enabling operation in accordance with a standard attachment unit interface (AUI) mode of operation, for connection to a different medium type, if the link test is not completed successfully;
- (e) means for determining whether the station is operating properly in the AUI mode; and
- (f) means for continuing operation in the AUI mode if proper operation in that mode is detected, and returning control to the means for enabling the 10BASE-F mode of operation, if proper operation in the AUI mode is not detected.

* * * * *